(12) United States Patent
Lee et al.

(10) Patent No.: US 11,984,559 B2
(45) Date of Patent: May 14, 2024

(54) ELECTRODE POSITION TRACKING SYSTEM

(71) Applicant: LG ENERGY SOLUTION, LTD., Seoul (KR)

(72) Inventors: Jae Hwan Lee, Daejeon (KR); Jong Seok Park, Daejeon (KR); Dong Yeop Lee, Daejeon (KR); Jun Hyo Su, Daejeon (KR); Ki Deok Han, Daejeon (KR); Byoung Eun Han, Daejeon (KR); Seung Huh, Daejeon (KR); Su Wan Park, Daejeon (KR); Gi Yeong Jeon, Daejeon (KR); Min Su Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 0 days.

(21) Appl. No.: 18/273,451

(22) PCT Filed: Aug. 8, 2022

(86) PCT No.: PCT/KR2022/011750
§ 371 (c)(1),
(2) Date: Jul. 20, 2023

(87) PCT Pub. No.: WO2023/018135
PCT Pub. Date: Feb. 16, 2023

(65) Prior Publication Data
US 2024/0047763 A1    Feb. 8, 2024

(30) Foreign Application Priority Data

Aug. 13, 2021   (KR) .................. 10-2021-0107647

(51) Int. Cl.
| | | |
|---|---|---|
| *H01M 10/0587* | (2010.01) | |
| *H01M 10/04* | (2006.01) | |
| *H01M 50/533* | (2021.01) | |

(52) U.S. Cl.
CPC ... *H01M 10/0587* (2013.01); *H01M 10/0409* (2013.01); *H01M 50/533* (2021.01)

(58) Field of Classification Search
CPC .......... H01M 10/0587; H01M 50/533; H01M 10/0409
See application file for complete search history.

(56) References Cited

U.S. PATENT DOCUMENTS

2003/0099330 A1* 5/2003 Mery ................. G01N 23/04
378/210

FOREIGN PATENT DOCUMENTS

| JP | 10-281749 A | 10/1998 |
| JP | 2015-159015 A | 9/2015 |

(Continued)

OTHER PUBLICATIONS

KR 10-2013010500lMT (Year: 2013).*

(Continued)

*Primary Examiner* — Alexander Usyatinsky
(74) *Attorney, Agent, or Firm* — Bryan Cave Leighton Paisner LLP

(57) ABSTRACT

A systems and methods for tracking a position of an electrode. The system may include: a notching controller configured to store pitch information of a unit electrode and to acquire electrode coordinate information of the electrode in a roll-to-roll state during a notching process and a cell identification (ID) of the unit electrode; a calculator configured to calculate coordinates of the cell ID from the pitch information and the cell ID; a roll map generator configured to generate a roll map based on the electrode coordinate (Continued)

information transmitted from the notching controller; and a mapping part configured to compare the coordinates of the roll map with the coordinates of the cell ID to derive an electrode position of the electrode during the electrode manufacturing process from which the unit electrode originates.

15 Claims, 7 Drawing Sheets

(56) References Cited

FOREIGN PATENT DOCUMENTS

| KR | 10-20020077420 | * | 10/2002 |
|---|---|---|---|
| KR | 2002-0077420 A | | 10/2002 |
| KR | 10-2006-0027260 A | | 3/2006 |
| KR | 10-1222218 B1 | | 1/2013 |
| KR | 10-2013-0015398 A | | 2/2013 |
| KR | 10-20130015398 | * | 2/2013 |
| KR | 10-2013-0105001 A | | 9/2013 |
| KR | 10-20130105001 | * | 9/2013 |
| KR | 10-2019-0127283 A | | 11/2019 |
| KR | 10-2059035 B1 | | 12/2019 |
| KR | 10-2020-0011228 A | | 2/2020 |
| KR | 10-2206908 B1 | | 1/2021 |
| KR | 102206908 | * | 1/2021 |
| KR | 10-2221782 B1 | | 3/2021 |
| KR | 10-2261757 B1 | | 6/2021 |
| WO | WO 2019193869 | * | 10/2019 |

OTHER PUBLICATIONS

KR10-20020077420MT (Year: 2002).*
KR 10-20130015398MT (Year: 2013).*
KR 102206908MT (Year: 2021).*
Decision to Grant a Ptent (Year: 2023).*

* cited by examiner

[FIG. 1]
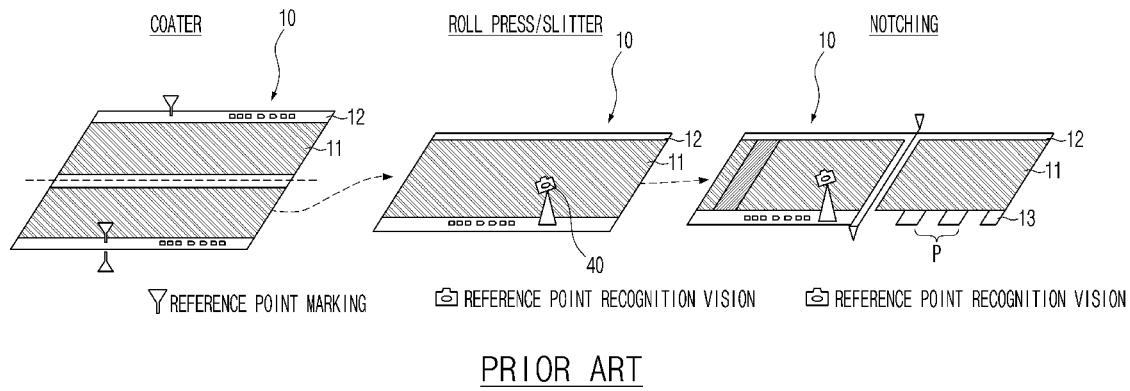
PRIOR ART
[FIG. 2]
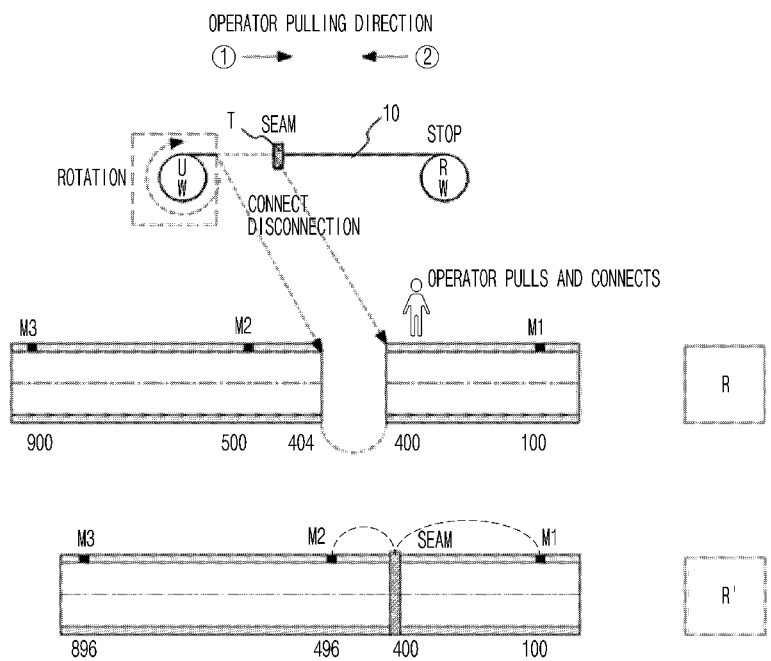
PRIOR ART

[FIG. 3]
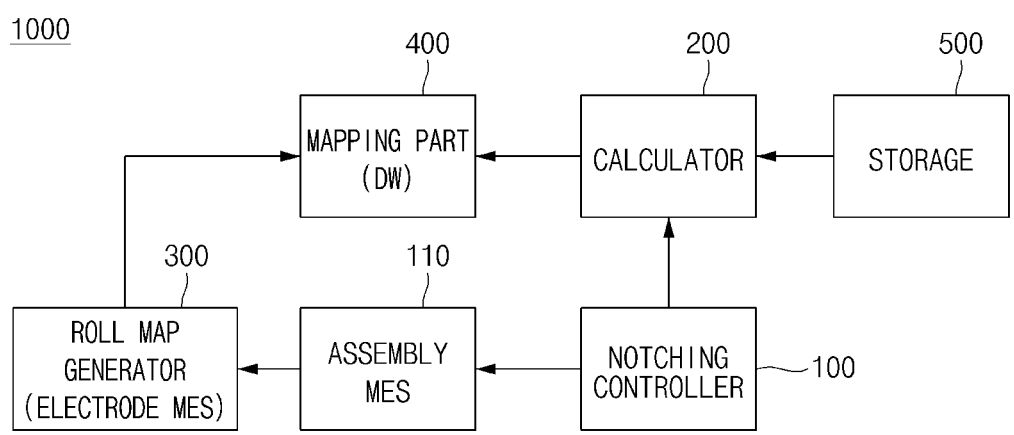

[FIG. 4]
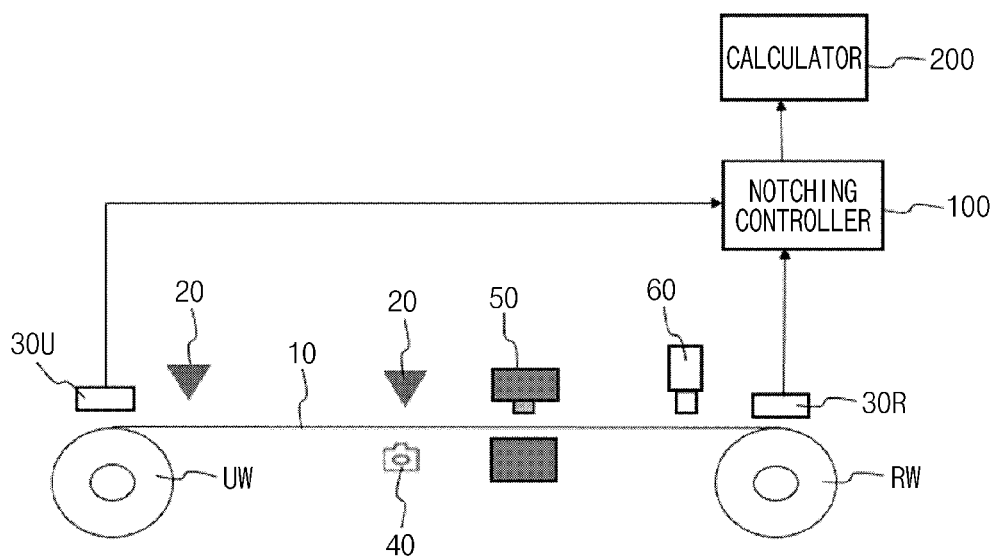

[FIG. 5]
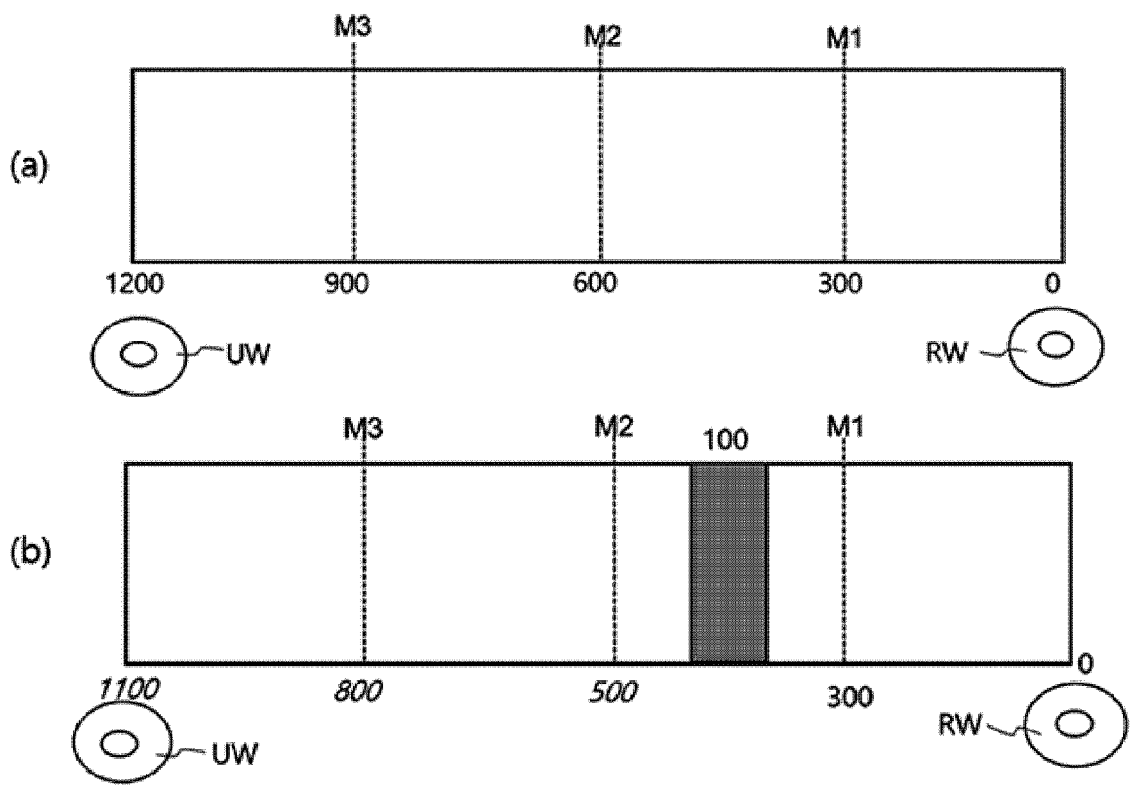

[FIG. 6]
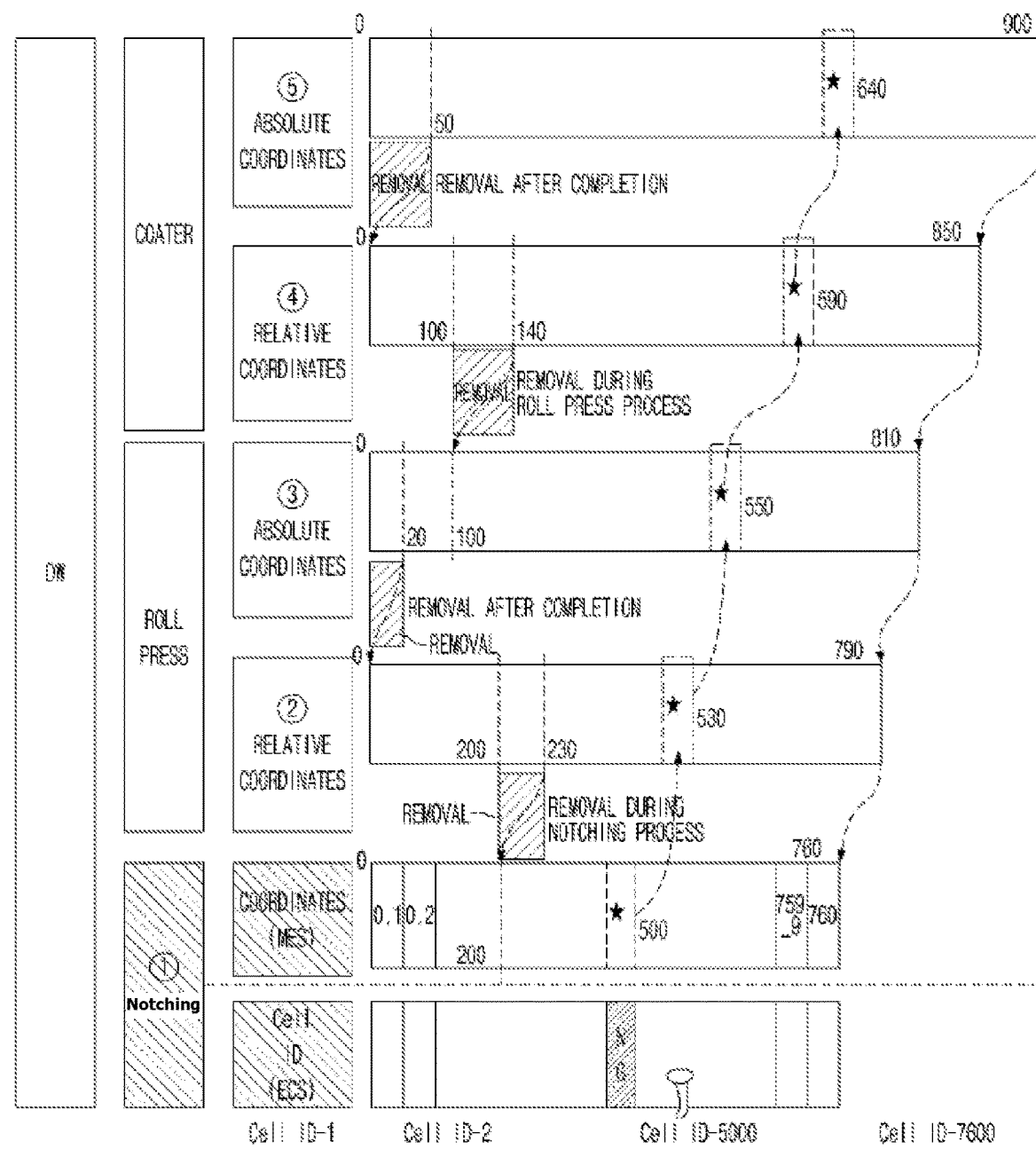

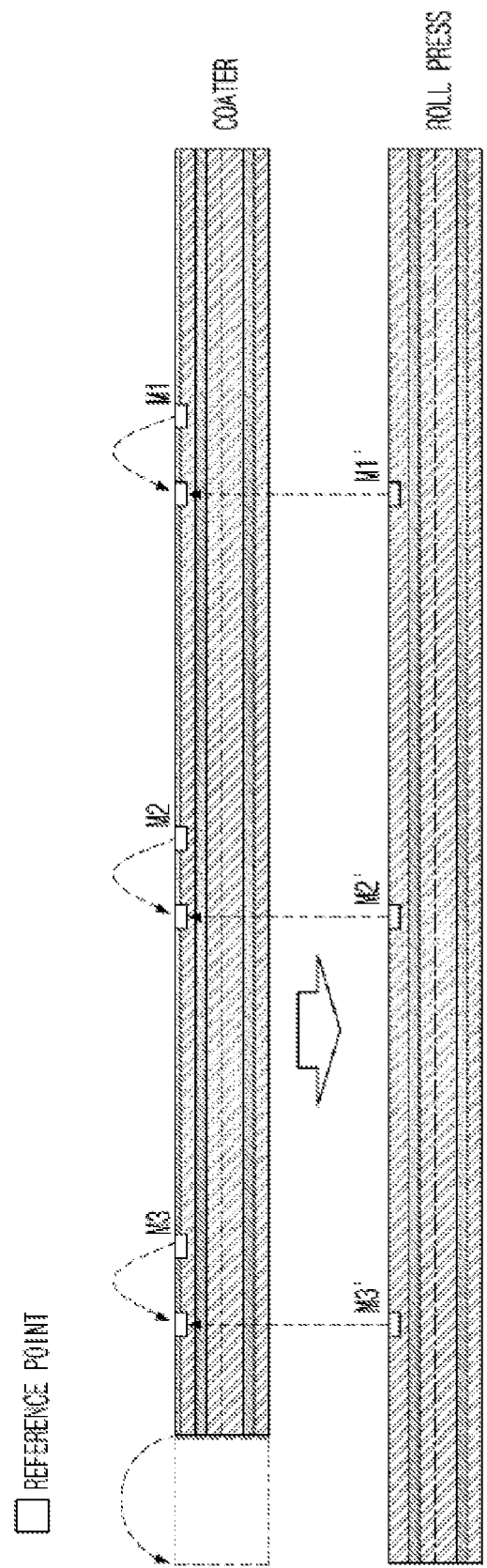
[FIG. 7]

[FIG. 8]
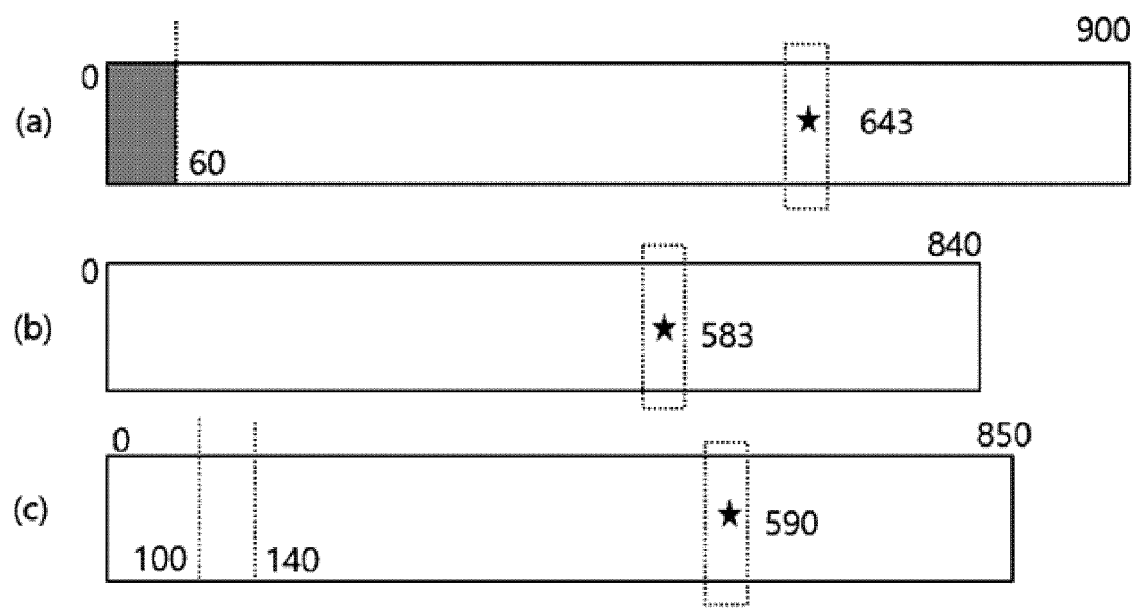

ELECTRODE POSITION TRACKING SYSTEM

CROSS-REFERENCE TO RELATED APPLICATION(S)

This application is a National Phase entry pursuant to 35 U.S.C. 371 of International Application No. PCT/KR2022/011750 filed on Aug. 8, 2022, which claims priority to and the benefit of Korean Patent Application No. 10-2021-0107647 dated on Aug. 13, 2021, and all contents published in the literature of the Korean patent application are incorporated as a part of the present specification.

TECHNICAL FIELD

The present disclosure relates to a system for tracking a position of an electrode, which is capable of tracking a position of an electrode manufactured in an operation prior to a notching process.

BACKGROUND

As the technology development and the demand for mobile devices increase, the demand for secondary batteries is also rapidly increasing. Among the secondary batteries, lithium secondary batteries are widely used as energy sources for various electronic products as well as various mobile devices due to high energy density, a high operating voltage, and excellent preservation and lifetime characteristics.

An electrode manufacturing process of manufacturing an electrode of a lithium secondary battery includes a plurality of detailed processes including a coating process of forming a positive electrode and a negative electrode by applying an active material and a predetermined insulating material to a surface of a metal electrode plate which is a current collector, a roll press process of rolling the coating electrode, and a slitting process of cutting the rolled electrode according to dimensions.

In the electrode manufactured in the electrode manufacturing process, an electrode tab is formed by a notching process, a separator is interposed between the positive electrode and the negative electrode to form an electrode assembly, and then a secondary battery is formed through an assembly process of stacking or folding the electrode assembly, packaging the electrode assembly in a pouch or can, and injecting an electrolyte. Then, the assembled secondary battery undergoes an activation process of imparting battery characteristics through charging and discharging to become a secondary battery that is a final finished product.

The electrode notching process can also be regarded as an electrode manufacturing process in a broad sense, but punching of the electrode tab after the electrode notching process is generally regarded as the electrode assembly process. Therefore, in the present specification, an operation before the notching process is regarded as the electrode manufacturing process (referred to as an electrode process).

FIG. 1 shows a state of an electrode in the electrode manufacturing process and the notching process.

When the current collector is coated with an active material in a coater, a coating portion 11 coated with the active material and a non-coating portion 12 not coated with the active material are formed. Thereafter, in the roll press process, the electrode is pressed and stretched by a press roll, and in a slitting process, the electrode is cut by a slitter in a length direction of the electrode.

Thereafter, in the notching process, the electrode is punched by a press or the like so that an electrode tab 13 is formed. In the notching process, the electrode tab 13 is formed as a unit electrode to allow each unit electrode, which is manufactured as a battery cell, to be cut or to allow each unit electrode to be cut in a subsequent process. Accordingly, a width of the unit electrode corresponds to a pitch P machined by the press.

Meanwhile, in the electrode manufacturing process and the notching process, the electrode is wound between an unwinder and a rewinder and transferred in a roll-to-roll state.

FIG. 2 shows a roll map in the electrode manufacturing process.

In the coating process, the roll press process, and the slitting process, the electrode is processed in a roll-to-roll state. The roll map is shown in the form of a bar by simulating the progress of the electrode, and a longitudinal dimension of the electrode is shown in coordinates on the roll map. Since information on defects, quality, electrode shearing, and the like occurring in the electrode manufacturing process is shown in the roll map together with the coordinates, data related to quality or defects in the electrode manufacturing process can be easily visually determined at a glance. For example, as shown in FIG. 2, when shearing occurs in an electrode 10 in a first process and thus an operator connects the shearing with a seam connection member T, a length of the electrode 10 is reduced by as much as a sheared length. The roll map can also simulate the above situation and modify the coordinates on the roll map. Referring to FIG. 2, a roll map R of a first process is corrected and, in a roll map R' of a second process, an entire length of the bar and positions of reference points M1, M2, and M3 shown in the electrode are corrected. As described above, the roll map includes information on electrode loss such as electrode shearing. In addition, the coordinates of the roll map can be represented in relative coordinates in which a change of the electrode length is reflected for each process (see R' of FIG. 2) and absolute coordinates in which the change of the electrode length is not reflected. The relative coordinates and the absolute coordinates may be displayed together on a single roll map. In addition, the roll map represented in the absolute coordinates may visually display the length of loss lost due to electrode shearing or the like on the roll map bar.

However, in the existing battery manufacturing process including the electrode manufacturing process and the notching process, when defects occur in a battery, which is a semi-finished product or a finished product, it is possible to analyze a cause of the defects for up to the notching process. For example, a cell identification (ID) is printed on the electrode tab 13 of FIG. 1, and when a problem occurs in a semi-finished battery or a finished battery, it is possible to analyze whether the problem originates at a stage prior to the manufacturing of the semi-finished battery or the finished battery by checking the cell ID. Accordingly, in the battery manufacturing process after the notching process, it is possible to track the cell ID to determine at which stage and at which location the semi-finished product or the finished product including the cell ID is manufactured so that quality tracking is possible in units of battery cells.

However, the quality tracking in units of battery cells is possible only for up to the notching process and is not performed in the electrode manufacturing process prior to the notching process. Prior to the notching process, only a lot number of an electrode roll in which a corresponding battery cell is manufactured can be determined. Thus, when a defective battery cell is detected, the entire corresponding electrode roll in an electrode manufacturing process line in which the battery cell is produced should be discarded.

Therefore, it is desired to develop a technology capable of tracking quality in units of battery cells even in the electrode manufacturing process prior to the notching process.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

RELATED ART DOCUMENT

Patent Document

Korean Patent Laid-Open Application No. 10-2020-0011228

SUMMARY

An object of the present disclosure is to provide a system for tracking a position of an electrode, which is capable of tracking a position of an electrode from which a unit electrode manufactured in a notching process originates using roll map information in an electrode manufacturing process.

In one embodiment of the present disclosure, there is provided a system for tracking a position of an electrode, which includes: a notching controller configured to store pitch information of a unit electrode and to acquire electrode coordinate information of the electrode in a roll-to-roll state during a notching process and a cell identification (ID) of the unit electrode, wherein the unit electrode is notched and the pitch information includes a width of the unit electrode; a calculator configured to calculate coordinates of the cell ID from the pitch information and the cell ID, wherein the coordinates of the cell ID include a position of the unit electrode during the notching process; a roll map generator configured to generate a roll map based on the electrode coordinate information transmitted from the notching controller, wherein the roll map includes coordinates of the roll map based on a dimension in a length direction of the electrode to determine a change in an electrode length during an electrode manufacturing process prior to the notching process; and a mapping part configured to compare the coordinates of the roll map with the coordinates of the cell ID to derive an electrode position of the electrode during the electrode manufacturing process from which the unit electrode originates.

When the electrode is between an unwinder and a rewinder during the notching process in the roll-to-roll state, the electrode coordinate information of the electrode moving in the roll-to-roll state in the notching process may be encoder value information indicating a position of the electrode according to rotation amounts of the unwinder and the rewinder.

The cell ID of the unit electrode may be an ID mark on the electrode tab, wherein the ID mark is punch-processed in the notching process, and the ID mark is on an upper portion of the electrode in the roll-to-roll state and may be acquired by an ID mark scanner connected to the notching controller.

The calculator may calculate a sequence number of the unit electrode from the ID mark and calculate the coordinates of the cell ID by multiplying the sequence number by the pitch information.

The system may further include a storage in which the sequence number according to the ID mark of the unit electrode is stored, and the calculator may compare the ID mark of the unit electrode with the sequence number stored in the storage to calculate a sequence number of the unit electrode.

The electrode manufacturing process prior to the notching process may include at least one of a coating process of coating a current collector with an electrode active material to form a coating electrode and a roll press process of rolling the coating electrode using a press roll.

The electrode manufacturing process prior to the notching process may further include a slitting process of cutting a rolled electrode after the roll press process in the length direction.

The roll map generator may generate the roll map during each of subprocesses of the electrode manufacturing process from data of the change in the electrode length during the electrode manufacturing process, wherein the data of the change in the electrode length is stored in the roll map generator, and wherein the data of the change in the electrode length is based on the electrode coordinate information transmitted from the notching controller.

The coordinates of the roll map may include relative coordinates, which may be based on the change in the electrode length and absolute coordinates, which are not based on the change in length of the electrode.

The mapping part may add a reduction value of the change in the electrode length in each of the subprocesses of the electrode manufacturing process to the coordinates of the cell ID of the unit electrode, and wherein the mapping part may derive an electrode position in each of the subprocesses of the electrode manufacturing process from which the specific unit electrode originates.

A reduction of the electrode length in the electrode process may be based on at least one of a removal portion of the electrode during each of the subprocesses or a removal of the electrode after the subprocesses.

When a portion of the electrode is removed during the notching process, the mapping part may add a length of the portion of the electrode and the reduction value of the electrode length, determined by the roll map during each of the subprocesses, to the coordinates of the cell ID of the unit electrode, and the mapping part may derive the electrode position in each of the subprocesses from which the unit electrode originates.

When each of the subprocesses of the electrode manufacturing process includes at least one of an electrode coating process and the roll press process, wherein, after completion of the electrode coating process, is the electrode may be stretched at a predetermined ratio by electrode rolling in the roll press process, the mapping part may determine the electrode position of the unit electrode during the coating process based on an increment amount of the electrode stretched during the roll press process from which the specific unit electrode originates.

The mapping part may calculate a position of the electrode after the roll press process by adding the reduction value of the electrode length, which is determined by the roll map during the roll press process, to the coordinates of the cell ID of the unit electrode and calculate the electrode position of the electrode during the electrode coating process from which the unit electrode originates by dividing the position of the electrode after the roll press process by the predetermined ratio.

The roll map generator generate the roll map of each of the coating process, the roll press process, and the slitting process, and the mapping part may compare the coordinates of the cell ID with the roll map coordinates of the coating process, the roll press process, and the slitting process, and the mapping part may derive the electrode position in the slitting process, the roll press process, or the electrode coating process from which the unit electrode originates.

In accordance with the present disclosure, in an electrode manufacturing process prior to a notching process, a position of an electrode from which a unit electrode of the notching process originates can be tracked.

In addition, since it is possible to confirm from which electrode a unit electrode manufactured in the notching process originates in the electrode manufacturing process, analysis of a cause of defects or quality tracking of semi-finished or finished battery cells in a subsequent process can be performed in units of cells for up to the electrode manufacturing process.

The effects of the present disclosure are not limited to the effects mentioned above and additional other effects not described above will be clearly understood from the description of the appended claims by those skilled in the art.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 1 is a schematic diagram illustrating a state of an electrode in an electrode manufacturing process and a notching process.

FIG. 2 is a diagram illustrating a roll map in the electrode manufacturing process.

FIG. 3 is a block diagram illustrating a system for tracking a position of an electrode of the present disclosure.

FIG. 4 is a schematic diagram for describing a notching process controlled by a notching controller according to the system for tracking a position of an electrode of the present disclosure.

FIG. 5 is a schematic diagram for describing a process of deriving a removal length when the electrode is removed during the notching process.

FIG. 6 is a schematic diagram illustrating an electrode position tracking process of the system for tracking a position of an electrode according to one embodiment of the present disclosure.

FIG. 7 is a schematic view illustrating that the electrode is stretched in a roll press process after electrode coating.

FIG. 8 is a schematic diagram illustrating a process of tracking an electrode position of the system for tracking a position of an electrode according to another embodiment of the present disclosure.

DETAILED DESCRIPTION

Hereinafter, a detailed configuration of the present disclosure will be described in detail with reference to the accompanying drawings and various embodiments. The embodiments described below are illustratively shown to aid understanding of the present disclosure, the accompanying drawings are not drawn to scale to aid the understanding of the present disclosure, and dimensions of some components may be exaggerated.

The present disclosure may be modified into various forms and may have a variety of embodiments, and therefore, specific embodiments will be illustrated in the drawings and a description thereof will be described in detail in the following description. The embodiments to be disclosed below, therefore, are not to be taken in a sense which limits the present disclosure to specific embodiments, and should be construed to include modifications, equivalents, or substitutes within the spirit and technical scope of the present disclosure.

FIG. 3 is a block diagram illustrating a system 1000 for tracking a position of an electrode of the present disclosure.

The system 1000 for tracking a position of an electrode of the present disclosure includes a notching controller 100 configured to store pitch information on a width of a unit electrode to be notched and acquire electrode coordinate information of an electrode line transferred in a roll-to-roll state in a notching process and a cell identification (ID) of the unit electrode, a calculator 200 configured to calculate coordinates of the cell ID, which is a position of a specific unit electrode moved in the notching process, from the pitch information and the cell ID which are acquired from the notching controller, a roll map generator 300 configured to generate a roll map in which a dimension in a length direction of the electrode is represented in coordinates so as to determine a change in electrode length in an electrode manufacturing process prior to the notching process from electrode coordinate information transmitted from the notching controller 100, and a mapping part 400 configured to compare the roll map coordinates with the cell ID coordinates so as to derive an electrode position in the electrode manufacturing process from which a specific unit electrode originates.

The present disclosure is to track the electrode manufacturing process prior to the notching process in units of cells. Therefore, in order to track the electrode position, a position of a tracking target electrode in the notching process should be specified first. In the notching process, since a continuous electrode sheet is processed at unit electrode intervals, a specific unit electrode among unit electrodes will be described as a tracking target electrode.

The system 1000 for tracking a position of an electrode of the present disclosure includes the notching controller 100, the calculator 200, the roll map generator 300, and the mapping part 400.

The notching controller 100 is a controller 100 for controlling the transfer of the electrode line transferred in a roll-to-roll state in the notching process. For example, the controller 100 is a programmable logic controller (PLC). The controller 100 stores pitch information on a width of the unit electrode for notching the electrode line at an interval of a unit electrode. In addition, the controller 100 may acquire electrode coordinate information on the electrode line transferred in a roll-to-roll state between the unwinder and the rewinder. When the electrode is transferred in the roll-to-roll state between the unwinder and the rewinder in the notching process, the electrode coordinate information may be acquired from encoder value information indicating an electrode position according to rotation amounts of the unwinder and the rewinder. In order to describe a function of the notching controller 100, a typical notching process will be described.

FIG. 4 is a schematic diagram for describing the notching process controlled by the notching controller 100 according to the system 1000 for tracking a position of an electrode of the present disclosure.

The electrode, which undergoes the roll press process or the slitting process, is loaded onto an unwinder UW as shown in FIG. 4, is released from the unwinder UW, and is notched while being transferred toward a rewinder RW. Since the electrode 10 is unwound from the unwinder UW and wound around the rewinder RW, a movement amount of the electrode or a position of each electrode 10 may be calculated from rotation amounts of the unwinder UW and the rewinder RW. A (rotary) encoder 30 is installed at each of the unwinder UW and rewinder RW. The encoder may extract an encoder value, which is a displacement or a position value of the electrode, from a rotation amount of a motor. That is, the encoder 30 is connected to a motor driving part installed in the unwinder UW and the rewinder RW to express an encoder value indicating the electrode position according to the rotation amounts of the unwinder UW and the rewinder RW. Electrode coordinate information (that is, electrode position information) of the electrode line in the notching process may be acquired from information on the encoder value. As shown in FIG. 4, an unwinder encoder 30U and a rewinder encoder 30R are connected to the notching controller 100 and transmit encoder values according to the movement of the electrode to the notching controller 100. Accordingly, the notching controller 100 may acquire electrode coordinate information and electrode length information of the electrode line, which is transferred in a roll-to-roll state, from the encoder values.

Meanwhile, the controller 100 may also acquire a cell ID of each unit electrode to be notched. Referring to FIG. 4, in the notching process, the electrode is punched using a punching device 50 to form an electrode tab for each unit electrode. A shape of the electrode tab is well illustrated in FIG. 1. After the punching, a predetermined ID mark is provided on the electrode tab of the unit electrode. For example, a barcode is printed on the electrode tab or the electrode tab is laser marked. A unit electrode and a semi-finished battery cell or a finished battery cell, which is manufactured with the unit electrode, may be distinguished from other semi-finished products and finished products by the ID mark such as the barcode or the laser marking. In this sense, the ID mark is referred to as a cell ID indicating an identity of the battery cell. A device for printing the cell ID is not shown in FIG. 4. However, the cell ID of the unit electrode, which is punch-processed in the punching device 50 and is printed with the ID mark, is scanned with an ID mark scanner 60 and transmitted to the notching controller 100. The notching controller 100 transmits the cell ID and the pitch information to the calculator 200, and the calculator 200 may calculate the cell ID coordinates, which are a position of a specific unit electrode moved in the notching process, from the pitch information and the cell ID.

Specifically, the calculator 200 may obtain a sequence number of a specific unit electrode from the ID (identification) mark (cell ID) and multiply the sequence number by the pitch information to obtain cell ID coordinates. For example, when barcodes are sequentially printed, as ID marks, on the electrode line in the notching process, the barcodes indicate sequence numbers of the unit electrodes. Generally, a relationship between the barcode (ID mark) and the unit electrode is stored in a storage 500 such as a server, and when the barcode is recognized, an order of the unit electrode may be determined. When a unit electrode of a specific barcode is omitted, this may mean that the unit electrode is missing from the notching line. Accordingly, the calculator 200 may obtain a sequence number of a specific unit electrode by comparing the sequence number stored in the storage 500 with the ID mark obtained by the ID mark scanner.

For example, when a pitch of the notching process is 0.1 meters and a sequence number of a corresponding specific unit electrode is 5000, cell ID coordinates of the specific unit electrode are 500 meters by multiplying the sequence number by the pitch. In this case, when an electrode length of a notching line is determined as being 760 meters from the electrode coordinate information obtained from the encoder values of the unwinder UW and the rewinder RW, the specific unit electrode may be specified as a unit electrode located at a position ranging from 760 meters to 500 meters.

The calculator 200 may be, for example, a real-time system such as an embedded computer system (ECS), and a microcomputer may be employed as the calculator 200. As described below, the calculator 200 calculates the cell ID coordinates and transmits the cell ID coordinates to the mapping part 400.

In addition, according to the present disclosure, the roll map generator 300 for generating a roll map from the electrode coordinate information transmitted from the notching controller 100 is included. Since the present disclosure is to track the electrode position in the electrode manufacturing process prior to the notching process, the roll map is also generated for each detailed process of the electrode manufacturing process. Specifically, the electrode manufacturing process prior to the notching process may include at least a coating process of coating a current collector with an electrode active material to form a coating electrode, and a roll press process of rolling the coating electrode using a press roll. In addition, the electrode manufacturing process prior to the notching process may further include a slitting process of cutting the rolled electrode after the roll press process in the length direction.

As described above, the roll map simulates an electrode progressing in a roll-to-roll state, and a dimension of the electrode in the length direction is represented in coordinates so that a change in the length of the electrode may be determined from the roll map.

Since the electrode in the notching process is manufactured from the electrode transferred in the roll-to-roll state in the previous slitting process, the roll press process, and the electrode coating process, a roll map including information on the change of the electrode length in the above processes so as to track the electrode position is needed. The roll map may be prepared in each of the electrode coating process, the roll press process, and the slitting process. Information on that the electrode is sheared and removed during a corresponding process or information on an electrode removal portion during a process in which defects occur and thus the electrode is removed by an operator is represented in the roll map. Since the dimension of the electrode in the length direction is represented in coordinates in the roll map, when an actual change in length during a corresponding process occurs due to shearing or connection of the electrode, the change may be represented on the roll map. In addition, since a plurality of reference points are marked at predetermined intervals on the roll map, a sheared length of the electrode may be calculated from the reference points. The reference point is marked by simulating the reference point printed on the electrode.

Meanwhile, during each detailed process of the electrode manufacturing process, a predetermined portion of the electrode may be cut after each detailed process is completed. Usually, since the quality of the electrode at an initial stage and a termination stage of the roll-to-roll progress is not uniform in many cases, an electrode at a beginning stage or a termination stage of a corresponding process is cut off in many cases. The above electrode removal portion is referred to as an electrode removal portion after completion. As described with reference to FIG. 2, the coordinates represented on the roll map include relative coordinates in which the change in length of the electrode is reflected and absolute coordinates in which the change in length of the electrode is not reflected. Accordingly, since the removed electrode portion may be represented together with the coordinate data on the roll map in which the absolute coordinates are represented, information on defects or shearing may be visually represented on the roll map. However, in the present disclosure, for convenience of description, visual information other than the length and coordinates of the electrode is omitted from and not represented on the roll map. In the case of the electrode manufacturing process including a plurality of detailed processes, a roll map of a preceding process may be referred to when preparing a roll map of a subsequent process. For example, when the electrode is manufactured by the electrode coating process, the roll press process, and the slitting process, the roll map in the electrode coating process is referred to in the subsequent roll press process. When the electrode is removed during the electrode coating process or removed after the coating process is completed, the above electrode removal should be reflected (corrected) in the roll map of the roll press process. That is, the roll map of the roll press process represents a reference point and coordinates with reference to the roll map in which the absolute coordinates of the electrode coating process are represented, and the coordinates should be corrected by reflecting details related to the change in length of the electrode. In this sense, the roll map including the absolute coordinates of the roll press process may be a roll map including the relative coordinates in the electrode coating process of the preceding process. Similarly, when a change in length of the electrode occurs during or after the roll press process, the change should be reflected in the roll map of the subsequent slitting process. The roll map of the slitting process reflecting the change may be a roll map of absolute coordinates in the slitting process and may be referred to as a roll map of the relative coordinates on the basis of the roll press process.

As described above, the roll map represented in absolute coordinates or the relative coordinates is relative with respect to a relationship between the processes. In the present disclosure, types of such coordinates may be appropriately utilized to track the position of the electrode.

The roll map generator 300 may reflect data on the change in length of the electrode in the electrode manufacturing process, which is stored in the roll map generator 300, in the electrode coordinate information transmitted from the notching controller 100 and generate a roll map in each detailed process of the electrode manufacturing process, for example, the coating process, the roll press process, and the slitting process. For example, the roll map generator 300 may be a manufacturing execution system (MES) for managing the electrode manufacturing process or one component of the MES. Similar to FIG. 4, in the coating process, the roll press process, and the slitting process, since the electrode is transferred in a roll-to-roll state between the unwinder and the rewinder RW, the electrode coordinate information of the electrode line may be obtained from the encoder value. In addition, when the electrode is removed during a corresponding process (removed during the corresponding process) or removed after the corresponding process is terminated (removed after completion), a removal length may also be determined with a change in interval between the reference points represented on the electrode. As shown in FIG. 4, since a reference point measuring instrument is disposed on the electrode line in the electrode manufacturing process, the electrode removal length may be measured using the reference point measuring instrument. All the pieces of information are stored in an electrode MES. Therefore, when only the electrode coordinate information transmitted from the notching controller 100 is specified, the data on the change in length of the electrode stored in the MES is added to or subtracted from the electrode coordinate information during the electrode manufacturing process, and thus, by inversely calculating, the roll maps of the slitting process, the roll press process, and the electrode coating process from which the notched electrode originates can be generated. The MES is provided as a data processing system and provided with a central processing unit, the calculator 200, and a determination unit, thereby being able to easily generate a roll map from the information. In addition, the MES may be provided with a predetermined data visualization device to visualize and display the roll map on a screen. Since a process of visualizing data, which is a source, as a diagram or graph is known in the art, a detailed description thereof will be omitted herein.

Referring to FIG. 3 again, the notching controller 100 may transmit coordinate information on the electrode line of the notching process to the MES 110 of the assembly process, and the MES 110 of the assembly process may transmit the coordinate information to the roll map generator 300. After the notching process, since a process belongs to an assembly process not the electrode manufacturing process (referred to as the electrode process), the notching controller 100 may be connected to the MES 110 of the assembly process. In addition, in the notching process, even without generating a roll map, it is possible to track the position of the electrode in the electrode manufacturing process from the coordinate information and the cell ID. However, in order to check the continuity and correlation between the notching process and the previous processes (e.g., the slitting process or the roll press process), a roll map of the notching process may be prepared in the MES 110 of the assembly process. In this case, the encoder value, the cell ID, and the pitch information, which are acquired by the notching controller 100 in the above-described notching process, may be used. Since the notching controller 100 actually acquires the electrode coordinate information of the notched electrode line, when the electrode coordinate information is expressed by coordinates, the expressed coordinates become a roll map of the notching process by itself (see FIG. 6 which will be described below).

The mapping part 400 compares the generated coordinates of the roll map with the cell ID coordinates to derive an electrode position in the electrode manufacturing process from which a specific unit electrode originates. The mapping part 400 may be a data warehouse DW configured to convert and manage data accumulated in a database into data in a common format. Since the data warehouse is able to make a data-based decision and integrate and analyze data from multiple sources, through a mapping operation of comparing and matching the cell ID coordinates from the calculator 200 and the roll map coordinates from the roll map generator 300, the data warehouse may derive the electrode position in the electrode manufacturing process from which the specific unit electrode of the notching process originates.

A process of estimating the electrode position by the mapping part 400 will be described in detail with reference to Examples and drawings as follows.

DETAILED DESCRIPTION OF THE PREFERRED EMBODIMENTS

First Embodiment

FIG. 6 is a schematic diagram illustrating an electrode position tracking process of the system 1000 for tracking a position of an electrode according to one embodiment of the present disclosure.

In an example shown in FIG. 6, it was confirmed that the stored pitch information was meters from the notching controller 100, and a length (coordinates) of the notched electrode line was 760 meters from the electrode coordinate information of the electrode line transferred in a roll-to-roll state in the notching process.

In addition, the ECS calculator 200 compared the barcodes with the sequence information input to the storage 500, checked that a sequence number of the specific unit electrode was 5000 from the barcode (cell ID) printed on the specific unit electrode of the notching process, and multiplied the pitch information (0.1 meters) by the sequence number to calculate the cell ID coordinates as 500 meters.

In addition, the encoder values stored in the notching controller 100 were transmitted to the electrode MES, which was the roll map generator 300, and the electrode MES generated the roll map of the roll press process and the roll map of the electrode coating process in absolute coordinates and relative coordinates. The cell ID coordinates calculated by the calculator 200 and the roll map information generated by the electrode MES were transmitted to the mapping part, and through the following comparison process, the mapping part 400 traced whether the specific unit electrode having the cell number 5000 in the notching process originates from any position of the electrode in the roll press process or originates from any position of the electrode in the electrode coating process.

Specifically, the mapping part 400 added a reduction value of the electrode length, which was confirmed by the roll map (the roll map of the roll press process and the roll map of the coating process) in each detailed process of the electrode manufacturing process to the cell ID coordinates (500 meters) of the specific unit electrode. Usually, the reduction in length of the electrode in the electrode process is resulting from at least one of the electrode removal during each detailed process (removal during the process) or the electrode removal after the detailed process (removal after completion).

As described above, the cell ID coordinates of the specific unit electrode of the notched electrode line are 500 meters. Therefore, when a problem, such as defects or the like, occurs in the semi-finished or finished battery cell based on the unit electrode produced at the point of 500 meters, by disassembling a corresponding battery cell and checking the cell ID, the electrode position in the electrode manufacturing process may be tracked, and thus, it is possible to analyze a cause of the defect in units of cells, such as which electrode position the defect originates from.

As described above, when the cell ID coordinates of the specific unit electrode of the notching line are specified, the electrode coordinates in the electrode manufacturing process from which the specific unit electrode originates are calculated by adding the reduction value of the electrode length confirmed by the roll map of each detailed process of the electrode manufacturing process.

In the present embodiment, it was assumed that the electrode coating process and the roll press process were performed as the detailed processes, and the roll map of the coating process and the roll map of the roll press process were used. For reference, although the slitting process is performed after the roll press process and a roll map may be prepared in the slitting process, since the principle of the process of tracking an electrode position is the same, in the present embodiment, the process of tracking an electrode position will be described excluding a change in length of the electrode in the slitting process. In addition, slitting is simply cutting the roll-pressed electrode in the length direction, and a severe change in length of the electrode as in the electrode coating process or the roll-pressing process rarely occurs. Therefore, in the present specification, the process of tracking an electrode position will be described excluding the roll map of the slitting process. However, when a roll map is prepared in the slitting process, it is possible to track the electrode position by comparing coordinates of the roll map using the same principle as in the present embodiment.

FIG. 6 shows that, for comparison with the roll press process, a roll map of the notching line was prepared in the assembly MES using the electrode coordinate information and the cell ID coordinate of the notched electrode line. However, as described above, the roll map of the notching process shown in FIG. 6 is shown for convenience of description and is not necessarily essential in tracking the electrode position. That is, even when only the cell ID coordinates of the notching process are present, the electrode position may be tracked using the roll map of the electrode manufacturing process. However, as described below, in a case in which the electrode is removed in the notching process, similar to the electrode manufacturing process, when a roll map of the notching process reflecting the electrode removal was prepared, there is an advantage of being able to more easily specify the electrode position in connection with the roll map of the preceding roll press process.

In the notching process, when there is no history of changing the cell ID coordinates of the specific unit electrode, the electrode position is tracked on the basis of the cell ID coordinates.

However, in the notching process, for example, when the electrode is removed during a process of removing a predetermined length, the removed length of the electrode should be added to enable tracking of an accurate electrode position. In the present embodiment, it is assumed that the electrode was removed during the notching process. When intervals between the plurality of reference points marked on the electrode are changed due to the electrode removal, the removed electrode during the notching process may be obtained by comparing set intervals of the reference points. This will be described below.

Referring to FIG. 6, when coordinates of a cell ID 5000 of the notching line is 500 meters and as much as 30 meters of the electrode is removed from the notching line (removal during the notching process), the coordinates of the unit electrode become 530 meters in the coordinates of the roll press process prior to the notching process. As described above, the roll map shown in relative coordinates in the roll press process may become a roll map in absolute coordinates on the basis of the notching process. In addition, in consideration of the removal of as much as 30 meters of the electrode during the notching process, an electrode length (coordinates) of the roll map in the roll press process represented in relative coordinates becomes 790 meters.

Next, the roll map represented in absolute coordinates of the roll map in the roll press process is referenced. Since as much as 20 meters of the electrode was removed (removal after completion) after the roll press process, when the removed length is added, coordinates of the electrode having a cell ID 5000 of the notching line in the roll press process become 550 meters, and the electrode length (coordinates) becomes 810 meters. Therefore, it can be seen that the specific unit electrode (with the cell ID 5000) having the coordinates of 500 meters in the notching line originated from an electrode having coordinates of 550 meters in the roll map of the roll press process. From the above description, at least the electrode position in the roll press process may be tracked in units of cells.

Furthermore, the process of tracking an electrode position in the electrode coating process will be described. After the electrode position of 550 meters is tracked on the basis of the absolute coordinates of the roll map of the roll press process, it can be seen from the roll map represented in the relative coordinates of the coating process that as much as 40 meters of the electrode was removed during the roll press process. Accordingly, the electrode coordinates of the specific unit electrode (with the cell ID 5000) having the coordinates of 500 meters in the notching line are changed from 550 meters to 590 meters, and the electrode length (coordinates) becomes 850 meters. Finally, the roll map represented in the absolute coordinates is compared with the roll map represented in the relative coordinates of the electrode coating process, thereby confirming that as much as 50 meters of the electrode is removed after the electrode coating process, and the electrode coordinates are corrected. Accordingly, the electrode coordinates of the specific unit electrode (with the cell ID 5000) having the coordinates of 500 meters in the notching line are changed from 590 meters to 640 meters, and the electrode length (coordinates) becomes 900 meters. That is, it can be seen that the electrode of 760 meters in the notching line originally had a length of 900 meters, and it can be understood that the unit electrode with the cell ID 5000 was manufactured from the electrode at a position of 640 meters during the electrode coating process.

As described above, by comparing the coordinates of the specific unit electrode in the notching line with the coordinates of the roll map, the electrode position of the roll press process from which the specific unit electrode originated or the electrode position of the electrode coating process can be tracked.

FIG. 5 is a schematic diagram for describing a process of deriving a removal length when the electrode is removed during the notching process.

A plurality of reference points are printed on the electrode in the notching process at predetermined intervals. A reference point detector 40 for detecting the reference points is shown in FIG. 4. When an electrode loss of 100 meters occurs due to, for example, electrode shearing between a first reference point M1 and a second reference point M2, a position value of the first reference point M1 is not changed, but second and third reference points M2 and M3 and a position of an end portion of the electrode are changed. When the reference point detector 40 and the encoder 30 linked thereto derive the changed reference point position values according to the reference point change, the notching controller 100 may calculate that a loss amount of the sheared electrode becomes 100 meters between the first reference point and the second reference point when compared to a set reference point position value.

Therefore, when an interval between the reference points is changed due to the removal of the electrode resulting from shearing or the like during the notching process, a derived reference point position value is compared with the set reference point position value so that a loss amount of the electrode (the removed length of the electrode) can be calculated.

Second Embodiment

FIG. 7 is a schematic view illustrating that the electrode is stretched in a roll press process after electrode coating, and FIG. 8 is a schematic diagram illustrating a method of tracking an electrode position according to another embodiment of the present disclosure.

As shown in FIG. 7, the electrode coating in the electrode coating process is rolled by a press roll (not shown) in the roll press process and stretched at a predetermined ratio. Therefore, when the electrode position is tracked in the previous process on the basis of the cell ID coordinates of the unit electrode in the notching process, it is necessary to reflect a coordinate change due to the stretching of the electrode. That is, the mapping part 400 may reflect an increment of the electrode whose length is increased by the electrode stretching to accurately derive the electrode position in the electrode coating process from which the specific unit electrode originates.

FIG. 8 shows an embodiment in which the electrode position is tracked in consideration of the electrode stretching by the roll press. FIG. 8C shows that the unit electrode with the cell ID of 5000 was originated from 590 meters in the roll press process by reflecting the electrode removal during the roll press process in FIG. 6, and the electrode length at this time was 850 meters. In FIG. 6, the electrode stretching by the roll press is not considered, but in FIG. 8, the electrode position of the electrode coating process is tracked in consideration of the electrode stretching.

FIG. 8A is a roll map represented in absolute coordinates in the coating process, which shows that 60 meters are removed from the electrode of 900 meters after the electrode coating process is completed. FIG. 8B is a roll map represented in relative coordinates in the coating process by reflecting the removal portion of 60 meters after completion. In the roll map of FIG. 8B, the electrode length (coordinates) becomes 840 meters. When the electrode stretching occurs by the roll press, the roll map of the roll press process is not consistent with the roll map of the electrode coating process. Therefore, it is necessary to correct the roll map by as much as the electrode stretching or to calculate electrode coordinates in consideration of an increase in length of the electrode according to the electrode stretching.

Referring to FIG. 8C again, the coordinates of 590 meters in the electrode having a length of 850 meters in the roll press process are a position of a roll press electrode from which a specific unit electrode in the notching process originates.

The coordinates of 590 meters of the roll press electrode is divided by a predetermined ratio (850/840) in which the electrode is stretched becomes 583 meters. That is, 583 meters become the electrode position of the electrode coating process from which the unit electrode of the notching process originates. However, in this case, since the electrode of 60 meters was removed after the coating process, the actual electrode coordinates of the coating process should be calculated by adding an electrode length of the removed portion after the coating process. When the removal portion of 60 meters is added after the coating process, the electrode length of the coating process becomes 900 meters, and the electrode coordinates of the electrode coating process from which the unit electrode originates becomes 643 meters so that the tracking of the electrode position is completed.

As described above, the present disclosure has been described in more detail with reference to the accompanying drawings and embodiments. Therefore, the configurations described herein or shown in the drawings are merely one embodiment of the present disclosure and do not represent all the technical spirit of the present disclosure such that it should be understood that there may be various equivalents and modifications capable of substituting the embodiments and the configurations at the time of filing the present application.

DESCRIPTION OF REFERENCE NUMERALS

10: electrode
11: coating portion
12: non-coating portion
13: electrode tab
P: pitch
T: seam connection member
M1, M2, M3: first, second, and third reference points
UW: unwinder
RW: rewinder
100: notching controller
110: assembly MES
200: calculator
300: roll map generator
400: mapping part
500: storage
20: seam detection sensor
30U, and 30R: encoders
40: reference point detector
50: punching device
60: identification (ID) mark scanner

The invention claimed is:

1. A system for tracking a position of an electrode, comprising:
a notching controller configured to store pitch information of a unit electrode and to acquire electrode coordinate information of the electrode in a roll-to-roll state during a notching process and a cell identification (ID) of the unit electrode, wherein the unit electrode is notched and the pitch information includes a width of the unit electrode;
a calculator configured to calculate coordinates of the cell ID from the pitch information and the cell ID, wherein the coordinates of the cell ID include a position of the unit electrode during the notching process;
a roll map generator configured to generate a roll map based on the electrode coordinate information transmitted from the notching controller, wherein the roll map includes coordinates of the roll map based on a dimension in a length direction of the electrode to determine a change in an electrode length during an electrode manufacturing process prior to the notching process; and
a mapping part configured to compare the coordinates of the roll map with the coordinates of the cell ID to derive an electrode position of the electrode during the electrode manufacturing process from which the unit electrode originates.

2. The system of claim 1, wherein, when the electrode is between an unwinder and a rewinder during the notching process in the roll-to-roll state, the electrode coordinate information of the electrode moving in the roll-to-roll state in the notching process is encoder value information indicating a position of the electrode according to rotation amounts of the unwinder and the rewinder.

3. The system of claim 1, wherein the cell ID of the unit electrode is an ID (Identification) mark on an electrode tab, wherein the ID mark is punch-processed in the notching process, and
wherein the ID mark is on an upper portion of the electrode in the roll-to-roll state and is acquired by an ID mark scanner connected to the notching controller.

4. The system of claim 2, wherein the calculator calculates a sequence number of the unit electrode from an ID (Identification) mark and calculates the coordinates of the cell ID by multiplying the sequence number by the pitch information.

5. The system of claim 4, further comprising a storage in which the sequence number according to the ID mark of the unit electrode is stored,
wherein the calculator compares the ID mark of the unit electrode with the sequence number stored in the storage to calculate a sequence number of the unit electrode.

6. The system of claim 1, wherein the electrode manufacturing process prior to the notching process includes at least one of a coating process of coating a current collector with an electrode active material to form a coating electrode and a roll press process of rolling the coating electrode using a press roll.

7. The system of claim 6, wherein the electrode manufacturing process prior to the notching process further includes a slitting process of cutting a rolled electrode after the roll press process in the length direction.

8. The system of claim 1, wherein the roll map generator generates the roll map during each of subprocesses of the electrode manufacturing process from data of the change in the electrode length during the electrode manufacturing process,
wherein the data of the change in the electrode length is stored in the roll map generator, and wherein the data of the change in the electrode length is based on the electrode coordinate information transmitted from the notching controller.

9. The system of claim 8, wherein the coordinates of the roll map include relative coordinates, which are based on the change in the electrode length and absolute coordinates, which are not based on the change in length of the electrode.

10. The system of claim 8, wherein the mapping part adds a reduction value of the change in the electrode length in each of the subprocess of the electrode manufacturing process to the coordinates of the cell ID of the unit electrode, and
wherein the mapping part derives an electrode position in each of the subprocesses of the electrode manufacturing process from which the unit electrode originates.

11. The system of claim 10, wherein a reduction of the electrode length in the electrode process is based on at least one of a removal of a portion of the electrode during each of the subprocesses or a removal of a portion the electrode after the subprocesses.

12. The system of claim 10, wherein, when a portion of the electrode is removed during the notching process, the mapping part adds a length of the portion of the electrode and the reduction value of the electrode length determined by the roll map during each of the subprocesses to the coordinates of the cell ID of the unit electrode, and
wherein the mapping part derives the electrode position in each of the subprocesses from which the unit electrode originates.

13. The system of claim 10, wherein, when each of the subprocesses of the electrode manufacturing process includes at least one of an electrode coating process and a roll press process,
- wherein, after the electrode coating process the electrode is stretched at a predetermined ratio by electrode rolling in the roll press process,
- wherein the mapping part determines the electrode position of the unit electrode during the coating process based on an increment amount of the electrode length stretched during the roll press process from which the unit electrode originates.

14. The system of claim 13, wherein the mapping part calculates a position of the electrode after the roll press process by adding the reduction value of the electrode length, which is determined by the roll map during the roll press process, to the coordinates of the cell ID of the unit electrode and calculates the electrode position of the electrode during the electrode coating process from which the unit electrode originates by dividing the position of the electrode after the roll press process by the predetermined ratio.

15. The system of claim 7, wherein the roll map generator generates the roll map of each of the coating process, the roll press process, and the slitting process; and
- wherein the mapping part compares the coordinates of the cell ID with the coordinates of the roll map of the coating process, the roll press process, and the slitting process, and
- wherein the mapping part derives the electrode position in the slitting process, the roll press process, or the electrode coating process from which the unit electrode originates.

* * * * *